Patented Jan. 1, 1946

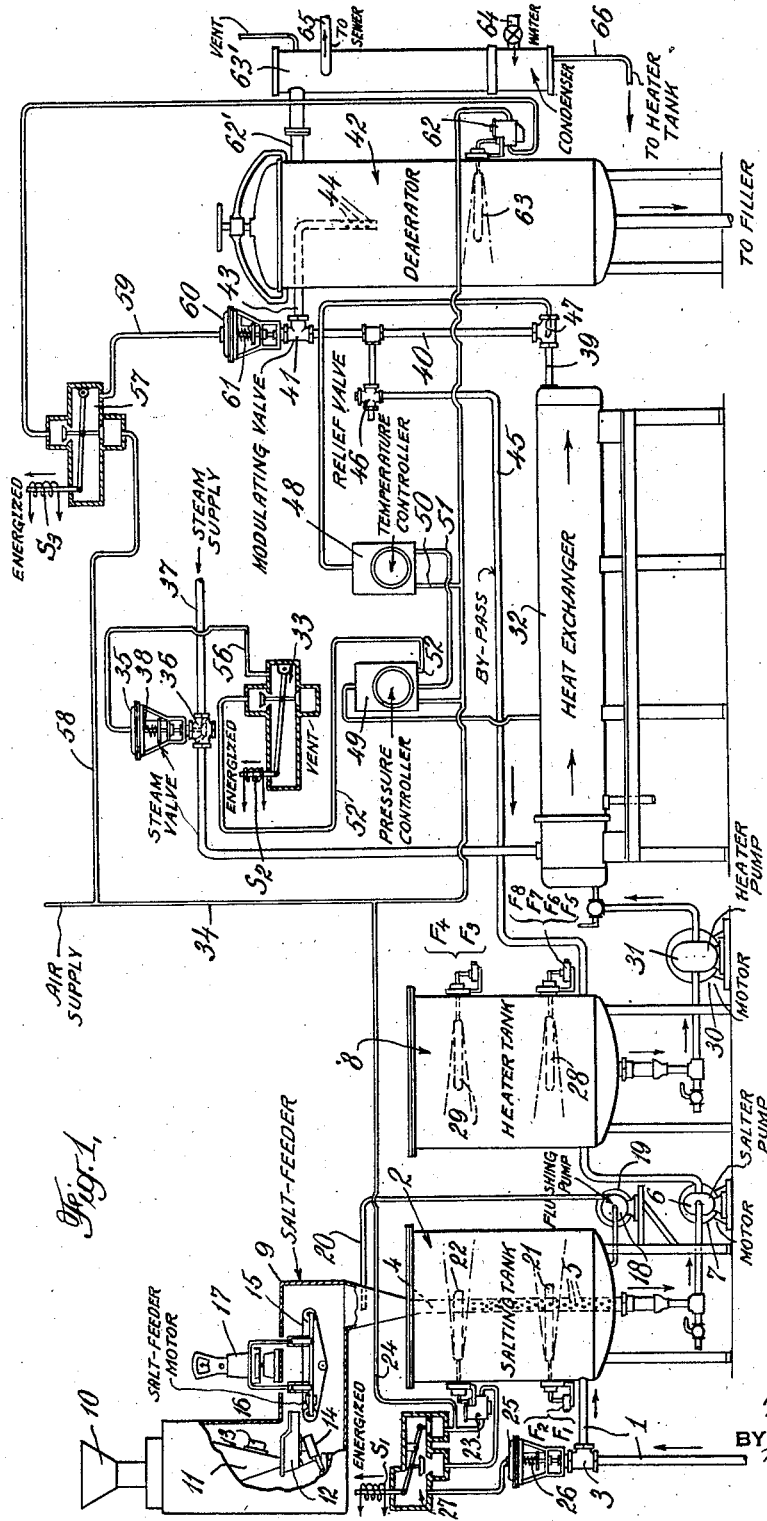

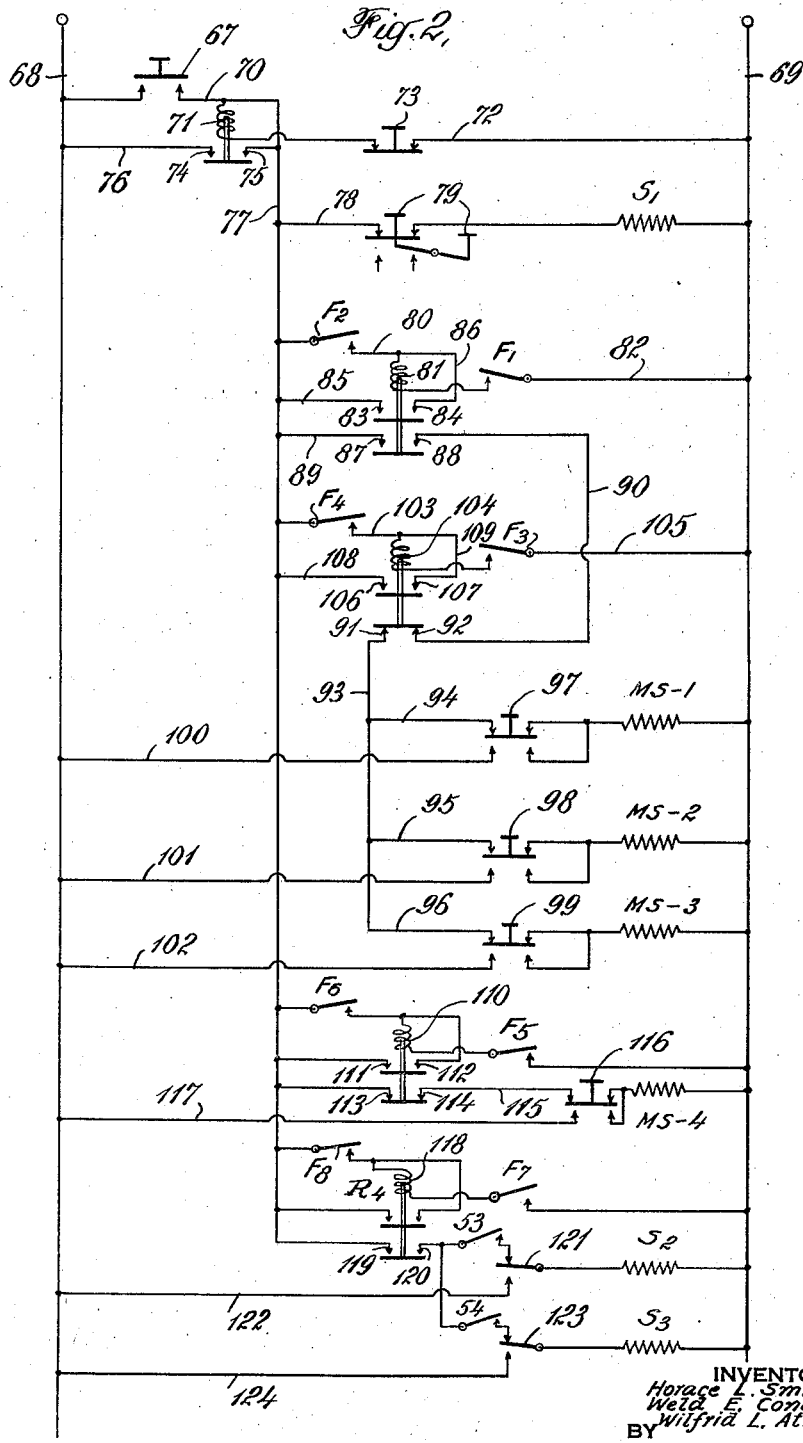

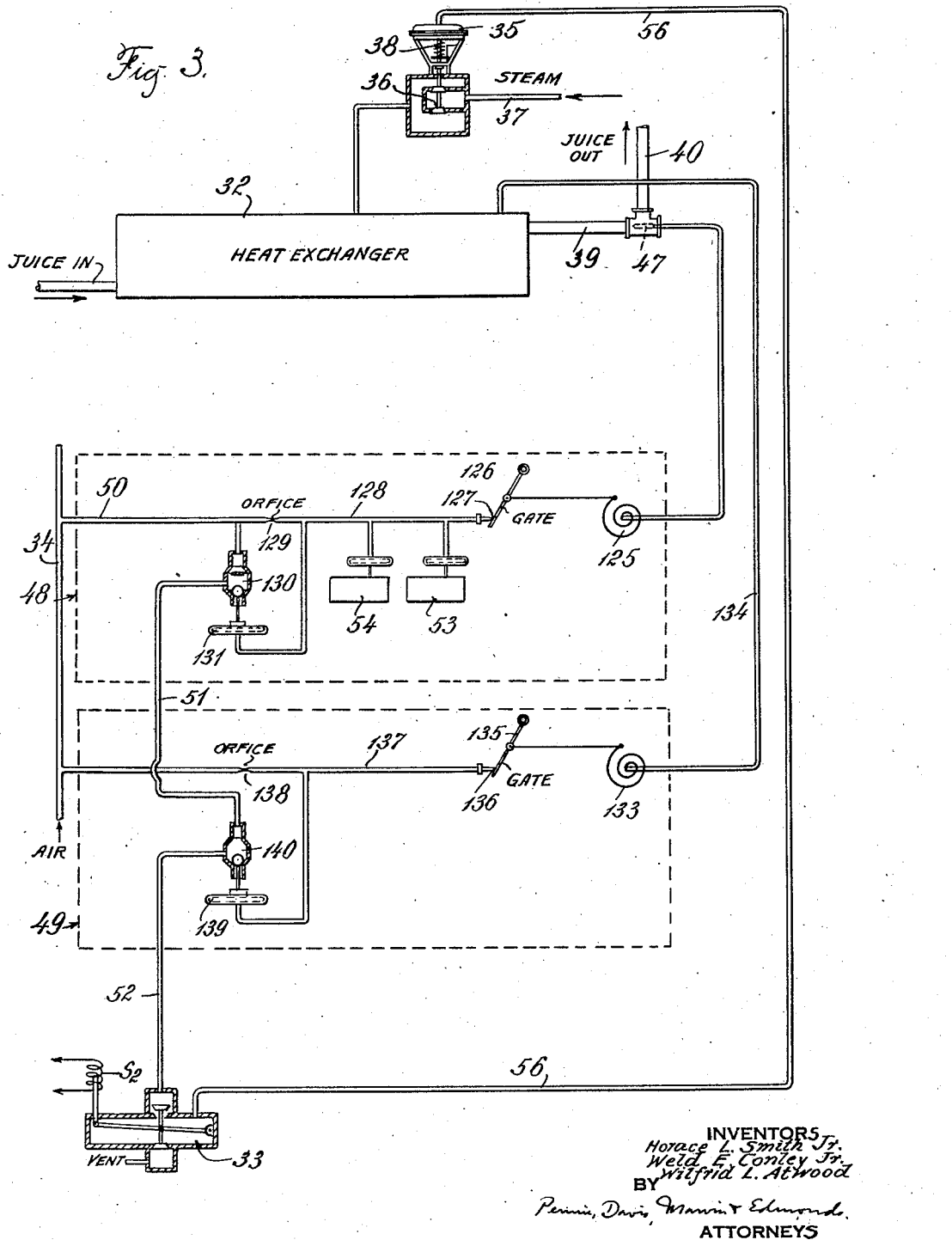

2,392,197

UNITED STATES PATENT OFFICE 2,392,197

TREATING TOMATO JUICE

Horace L. Smith, Jr., Weld E. Conley, Jr., and Wilfrid L. Atwood, Richmond, Va., assignors, by mesne assignments, to Chain Belt Company, Milwaukee, Wis., a corporation of Wisconsin Application July 30, 1941, Serial No. 404,612

8 Claims. (Cl. 99—155)

This invention relates to a method and apparatus for treating tomato juice before it is canned or bottled.

As soon as whole tomatoes are crushed to extract the juice, the pectic enzymes which are liberated begin to act upon the pectin to convert it into pectic acid. The solid matter is held in suspension in the juice by the pectin, but when the pectin is changed to pectic acid the solid matter separates from the liquid and settles. The time required for the enzymes to complete the converting action on the pectin varies in accordance with the degree of enzyme concentration in the juice. The conversion is substantially completed at room temperature in about 12 or 13 minutes after extraction in the case of a juice having a low enzyme concentration, and in about 3 or 4 minutes when the juice has a high enzyme concentration. If the juice is heated to some temperature above 160° F., before a substantial part of this time interval has elapsed, and held at that temperature for a certain interval of time, the enzymes will be rendered inactive, most of the pectin will be preserved, and the solid matter will not separate and settle. If a temperature of 160° F. is employed for this purpose the juice must be held at that temperature for about two minutes. If higher temperatures are used the holding time need not be so long. For instance, if a temperature of around 205° F. is maintained, the holding time need be only about 30 seconds.

It is also desirable to sterilize the juice by heating it. The temperature required to kill the bacteria is somewhat higher than that required to inactivate the enzymes, and here again the higher the temperature the shorter may be the time at which the juice is held at the sterilizing temperature. For instance, holding the juice at about 205° F. for about 6 minutes will accomplish a satisfactory bacteria kill under ordinary conditions. At about 226° F. the holding time may be about one minute, and at about 245° F. the holding time may be of the order of 5 seconds. It is much better to heat to a higher temperature for a shorter time than to hold the juice for a longer time at a lower temperature because its flavor and color are detrimentally affected by a relatively long heat treatment.

In order to inactivate the enzymes and protect the pectin from substantial change to pectic acid it has been proposed to crush the tomatoes while they are maintained at a high enough temperature to destroy the enzymes. This process has the advantage that the delay in subjecting the extracted juice to the enzyme-inactivating heat treatment is reduced to zero thus affording to the enzymes no time interval, at a favorable temperature, to get in their pectin-destroying action. However, such a process has the disadvantage of subjecting the juice to heat for too long a time which causes darkening and loss of flavor. For this reason the most common practice is to crush the tomatoes by the "cold-break" process, i. e., at room temperature.

In accordance with our invention the tomatoes are crushed at room temperature thereby retaining the advantage of the cold-break process so far as preservation of color and flavor are concerned, but before the elapse of any substantial part of the above mentioned time interval required for the conversion of the pectin by the enzymes, the juice is subjected to a temperature and for a time sufficient to inactivate the enzymes. In the preferred form of the method the juice is raised to a temperature which is not only high enough to destroy the enzymes, but is sufficiently high to kill the bacteria, and preferably so high that the holding time at that high temperature need be very short. At the end of the brief sterilizing period, the temperature of the juice is reduced in one or more stages before it is delivered to the filling machine. However, the reduced temperature is still high enough to be considered a prolongation of the enzyme-destroying temperature which operates throughout a sufficient period of time to completely inactivate the enzymes. The process is so conducted that the time which elapses from the extraction of the juice to its delivery to the filling machine may be kept well within the above mentioned period of 12 or 13 minutes during which the enzymes, in a low concentration juice, would destroy the pectin under ordinary conditions, and even within the 3 or 4 minute period during which that would happen in the case of a high concentration juice. To make this possible the juice is promptly delivered to a heat exchanger in which the juice is quickly brought up to the maximum temperature and through which the juice flows continuously and rapidly while it is being heated.

Before the juice is subjected to the sterilizing temperature, granular salt is mixed with it, hence any bacteria introduced with the salt are also killed at the time of sterilization. The juice may be deaerated before it is heated in the heat exchanger but preferably this takes place as a final step before filling.

The accompanying drawings illustrate apparatus constructed in accordance with the invention and which is suitable for carrying out the improved method.

Figure 1 is a more or less diagrammatic representation of the apparatus, some parts being shown in section and others in elevation, Fig. 2 is a simplified wiring diagram of the electric control system, and Fig. 3 is an enlarged diagrammatic view, illustrating in more detail the pressure and temperature controllers shown in Fig. 1.

The juice is extracted from the tomatoes at room temperature in any suitable type of apparatus, not shown in the drawings. It is immediately pumped, or fed by gravity, through a pipe 1 to a salting tank 2. The flow of juice into the salting tank is regulated by an air-controlled valve 3. Passing through the salting tank is a central pipe 4 the lower portion of which is perforated as indicated at 5. A pump 6, operated by an electric motor 7, is connected to the lower end of the pipe 4 and draws the juice from the tank 2 through the pipe openings 5 and delivers it to the heater tank 8, which maintains a reserve supply of juice to be fed to the heat exchanger as will later appear. Granular salt is automatically fed into the upper end of pipe 4 of the salting tank by means of a salt-feeder 9. This may be a piece of apparatus of a well known type that is used for feeding granular or pulverulent material. For present purposes it is sufficient to note that the salt is introduced through a funnel 10 into a hopper 11 from which it feeds onto a trough 12. The hopper 11 is vibrated by an electric vibrator 13 to prevent arching of the salt. The trough 12 is vibrated longitudinally by an electro-magnet 14 and this causes the salt to progress along the trough and to feed onto the upper run of an endless conveyor belt 15, which is driven at a constant speed by an electric motor 16. The belt 15 and the parts which carry it, are supported by the platform of a weighing scale 17. When the motor 16 is operating, the belt feeds the salt into the pipe 4 at a predetermined and regulated rate. If the weight of the salt on the belt 15 at any given time exceeds a predetermined figure the scale operates a switch which throws the electro-magnets 13 and 14 out of operation and hence stops the feed of salt onto the conveyor belt until the weight of the salt thereon is reduced enough to cause the electro-magnets 13 and 14 to be thrown back into operation by the scale to feed more salt onto the belt.

A flushing pump 18, operated by an electric motor 19, withdraws a small amount of juice from the lower part of the salting tank and delivers it by means of a pipe 20 to the upper end of the pipe 4 so as to wash the salt down through the pipe and prevent it from caking on the pipe and clogging it.

In the salting tank there are two floats, a lower one indicated at 21 and an upper one indicated at 22. The upper float operates a pilot valve 23 which, under normal operating conditions, controls the supply of air from an air pipe 24 to the diaphragm casing 25 of the juice inlet valve 3. When the float 22 is lifted by the juice in the salting tank and approaches its highest position the pilot valve 23 is shifted to admit air to the diaphragm casing 25 of the valve 3 to close this valve. The valve 3 is normally maintained in its open position by a spring 26. When the level of the juice in the tank recedes and the float 22 approaches its lowest position the pilot valve 23 will cut off the supply of air to the diaphragm casing 26 and allow the valve 3 to open. Intermediate positions of the float 22 will throttle the supply of air to the diaphragm casing 25 and adjust the position of valve 3 accordingly. It will thus be seen that if the juice flows into the salting tank at a faster rate than it can be handled by the subsequent equipment the level of the juice in the salting tank will rise until the upper float throttles or closes valve 3 to slow down or stop the flow of juice into this tank. When the level recedes, the normal flow of juice into the salting tank will be resumed.

A three-way valve represented diagrammatically at 27 is operated by a solenoid $S_1$. In normal operation this solenoid remains energized to maintain the three-way valve in the position shown in the drawings in which the pilot valve 23 will control the supply of air to the diaphragm casing 25 of the valve 3 in the manner just described. However, if it should be desired to close the valve 3, regardless of the position of the float 22, this may be done by pushing a button hereinafter referred to. This will deenergize solenoid $S_1$ thereby causing the three-way valve 27 to cut off communication between the pilot valve 23 and the diaphragm casing 25 of the valve 3, and to establish communication directly between the air pipe 24 and the diaphragm casing.

The lower float 21 operates two electric switches $F_1$ and $F_2$ which control simultaneously the operation of the salter pump motor 6, the flushing pump motor 19, and the salt-feeder motor 16. When the juice begins flowing into the salting tank, and when it starts lifting the float 21, the switch $F_1$ will close but the three motors will not yet start. When the float 21 approaches its highest position the switch $F_2$ will also close and then circuits will be completed, as hereinafter described, which will cause all three of the motors to start. Therefore, the belt 15 of the salt-feeder will begin feeding salt into the salting tank, the flushing pump will begin circulating a small amount of juice through the pipe 4, and the salter pump will start pumping juice from the salting tank into the heater tank. The three motors will continue to operate for all levels of the juice above the highest position of the float 21 and until the level of the juice recedes low enough for this float to open not only the switch $F_2$ but the switch $F_1$ as well. Thereupon delivery of salt into the salting tank, circulation of juice through the pipe 4, and flow of juice from the salting tank to the heater tank will cease. This will happen, however, only when the flow of juice into the salting tank is less than the capacity of the salter pump 6. Under normal conditions the juice will be pumped out of the salter tank at about the same rate that it enters it. Therefore the level of the juice in the salter tank should stay at or slightly above the highest position of the lower float 21. When, however, the salter pump is started by this float rising to its highest position, it will not stop again as soon as the float starts to drop but will continue to run until the float reaches its lowest position. This insures that the salter pump and the salt-feeder will operate over a long enough period so that alternate and unavoidable brief periods of over-salting and under-salting by the salt-feeder will cumulatively produce substantially uniform salting.

The salter pump 6 is a constant delivery pump and its speed is so adjusted relative to the speed at which the conveyor belt 15 of the salt-feeder is operated that the desired amount of salt is fed to a unit volume of juice, and inasmuch as the salt is delivered to the pipe 4 at a very uniform rate, and inasmuch as the motor of the conveyor belt 15 and the motor of the salter pump are tied together electrically to start and stop simultaneously, the salt content of the juice may be maintained practically constant. The juice, as it is drawn through the openings 5 at the lower end of the pipe 4 by the salter pump, intimately mixes with the salt passing down the pipe and immediately dissolves it.

In the heater tank 8 there are also two floats, a lower one 28 and an upper one 29. The upper float 29 operates two electric switches F3 and F4. In the lowest position of the float 29 these switches are both open. When the juice starts lifting the float, the switch F3 closes, and when the float approaches its highest position the switch F4 also closes. When both switches are closed the motor 7 of the salter pump is stopped, and regardless of the position of the float 21 in the salting tank, no more juice will be pumped from the salting tank to the heater tank. Simultaneously the flushing pump motor and the salt-feeder motor are also stopped. The upper float 29 therefore eliminates the possibility of pumping so much juice into the heater tank as to cause it it overflow. When this float stops the pumping of juice into the heater tank, the level of the juice in the salting tank will rise until the upper float 22 therein stops the delivery of juice to the salting tank through inlet valve 3. When the level of the juice in the heater tank 8 recedes far enough to cause the float 29 to open not only switch F4 but switch F3 as well, the circuits of the three motors associated with the salting tank will again be completed and these motors will again start, provided this is permitted by the switches F1 and F2 controlled by the float 21 in the salting tank.

The lower float 28 in the heater tank controls four switches F5, F6, F7, and F8. All of these switches are open in the lowest position of the float 28 and closed in the raised position of the float. When the juice in the heater tank starts to lift the float 28, switch F5 closes. When the float reaches its intermediate position it also closes switch F6. When both of these switches are closed they start the motor 30 of the heater pump 31. Juice is then pumped from the heater tank through the heat exchanger 32. In the mid position of float 28 the switch F7 is also closed and when the float 28 approaches its highest position the switch F8 is closed. When both switches F7 and F8 are closed a circuit is completed to the solenoid S2 of a three-way valve represented diagrammatically at 33. When the solenoid S2 is energized this three-way valve is in the position shown in the drawings in which air will be admitted from an air pipe 34, first through the control apparatus 49 to be hereinafter described, and then through the pipe 52 and casing of the three-way valve 33 to the diaphragm casing 35 of a steam valve 36 located in a steam supply line 37. When air is thus admitted to the diaphragm casing of the steam valve 36 this valve will be opened to turn on the supply of steam to the heat exchanger 32. When the solenoid S2 is deenergized the position of the three-way valve 33 will be reversed so as to cut off the supply of air to the diaphragm casing 35 and to place the diaphragm casing in communication with the atmosphere thereby allowing a spring 38 to close the steam valve 36. If the level of the juice in the heater tank recedes far enough to lower the float 28 from its raised position to its intermediate position, the switch F8 will first open but this will not yet deenergize the solenoid S2. When however the float reaches its intermediate position the switch F7 will also open and then the circuit to the solenoid S2 will be broken thereby causing the steam valve 36 to close. At the intermediate position of the float 28 the switch F6 will be open but the motor 30 of the heater pump 31 will continue to operate until the float reaches its lowermost position and also opens switch F5.

Thus it will be seen that when the system is initially started, or when it is restarted after draining for clean-up purposes or to make repairs, there will be a delay from the time the heater pump starts circulating juice through the heat exchanger to the time that the heat supply is turned on. The juice in rising in the heater tank lifts the float 28 to its intermediate position whereupon the heater pump will start but the steam will not be admitted to the heat exchanger until the float 28 is lifted by the juice to its highest position. This insures that the pump will have had time to pump juice entirely through the heat exchanger and completely fill the tubes before the heat is turned on. If the heat were turned on before this took place there would be danger of scorching the juice and burning it onto the heat exchanger tubes. Moreover, during normal operation of the system should the level of the juice in the heater tank recede far enough to cause the lower float 28 to drop, the heat supply to the heat exchanger will first be shut off and later the pump will stop circulating juice through the heat exchanger. If steam were still being supplied to the heat exchanger when the juice stopped flowing through it there might be danger of the juice absorbing too much heat and being scorched or injured by it.

The juice leaves the heat exchanger by means of a pipe 39 and rises through a pipe 40 to a modulating valve 41 which controls the passage of the juice into the deaerator 42. When the valve 41 is open the juice passes through a pipe 43 and is sprayed into the deaerator through perforations 44 in the end of this pipe. A by-pass pipe 45 connects the pipe 40 with heater tank 8. In this by-pass there is located a relief valve 46. When the modulating valve 41 is closed, the pressure of the juice is built up until the relief valve 46 opens and the juice is then by-passed back through the pipe 45 to the heater tank 8. When modulating valve 41 is open the relief valve 46 is closed and all of the juice is then delivered through the modulating valve into the deaerator and none of it by-passes back to the heater tank.

There is inserted into the pipe line 39—40, preferably at the juncture of these two pipes, and close to the exit of the heat exchanger, a heat responsive element 47 which is operatively connected to a temperature controller 48. This temperature controller, and a pressure controller 49, are of a well known type and control the supply of air from the pipe 34, through the three-way valve 33, to the steam control valve in accordance with the temperature of the juice leaving the heat exchanger and the pressure of the steam therein.

The arrangement of the control is such that the temperature of the juice leaving the heat exchanger, as indicated by the responsive element 47, governs the supply of steam to the heat exchanger so long as the pressure of this steam remains below a predetermined value, so fixed as to insure against excessive pressure on the heat exchanger shell and avoid any possibility of scorching the juice onto the heat exchanger tubes due to excessive temperatures. If for any reason the steam pressure exceeds this predetermined value, a further control, acting independently of the juice temperature at the element 47, quickly reduces the steam pressure to a safe value.

The control is also arranged to insure that all juice delivered to the deaerator will be heated to the required temperature. If the control merely increased the steam supply when the temperature of the juice leaving the exchanger was too low, then some juice would pass on to the deaerator without having been heated to the required value. When the temperature-responsive element 47 indicates a juice temperature below that required, the automatic control immediately acts to close the deaerator inlet modulationg valve 41 and thereby causes the under-temperature juice to recirculate through the heat exchanger by way of the relief valve 46 and the by-pass pipe 45.

Any suitable mechanism may be provided for effectuating the control described above, and a typical arrangement has been diagrammatically illustrated in Fig. 3 to which reference is now made. The instruments shown are in effect a combined temperature controller 48 and pressure controller 49, the housings of which have been generally indicated by broken lines. The bulb of the heat-responsive element 47 is connected to a Bourdon tube 125 in the temperature controller 48. This tube operates through the gate 126 and the bleeder hole 127 to bleed air from and so lower the air pressure in the pipe 128 when the juice temperature falls below the desired value, and to close the hole 127 by the gate 126 when the temperature rises to or remains above the desired value, thereby increasing the air pressure in the pipe 128. The pipe 128 is supplied with air from the air supply pipe 34 and branch pipe 50 through a restricted orifice 129. Connected to the pipe 128 are two air pressure-operated microswitches 53 and 54. The switch 53 is arranged to open when, due to an undesirably high juice temperature, the pressure in the pipe 128 has built up above some predetermined value, say 12 pounds per square inch. As shown on Fig. 2, when switch 53 opens, it de-energizes the solenoid $S_2$ of the three-way valve 33, thus venting the diaphragm of the steam valve 36 to atmosphere and causing the steam valve to immediately close. The second pressure-operated microswitch 54 connected to the pipe 128 prevents the passage of under-heated juice to the deaerator. As shown in Fig. 2, this switch is connected in the circuit that energizes the solenoid $S_3$ of the three-way valve 57 which controls the modulating valve 41 at the inlet to the deaerator. If the juice temperature, as indicated by the element 47, falls below the desired value, the air pressure in the pipe 128 is reduced to a point where the switch 54 opens, de-energizing the solenoid $S_3$ and thereby applying full air pressure to the diaphragm of the modulating valve 41 to close this valve, whereby the juice leaving the heat exchanger is recirculated through the relief valve 46 and by-pass pipe 45.

Assuming that the steam pressure within the heat exchanger 32 is at or below the maximum safe value, the air pressure in the pipe 128 of the temperature controller governs the supply of steam to the heat exchanger. This is accomplished by the pilot valve 130 which is opened or closed by the capsule 131 connected to the air pressure in the pipe 128. As the air pressure is increased due to a rise in the juice temperature, as indicated by the responsive element 47, the capsule 131 expands, the pilot valve 130 is operated to vent the pressure supplied from the supply pipe 34 to the pipes 51, 52 and 56 and the diaphragm of the steam valve 36. This reduces the steam valve opening and thus lowers the heat exchanger temperature. Conversely, when the juice temperature as indicated by the element 47 falls, pressure in the pipe 128 is lowered, causing the capsule 131 to collapse and discontinue venting by the pilot valve 130, whereupon the pressure in the line supplying the steam valve diaphragm rises and the steam valve opens to admit more steam and increase the heat exchanger temperature.

If at any time the steam pressure in the exchanger 32 rises to a dangerous point, that is, one at which the exchanger structure might be endangered or at which juice might be burnt on the tubes, the pressure controller 49 in effect disables the above described control of the steam supply through the temperature controller 48, and immediately closes the steam valve. As shown in Fig. 3, this is accomplished through a Bourdon tube 133 connected by the pipe 134 to the heat exchanger and operating a gate 135 which governs the bleeding of air from a bleeder hole 136 in a pipe 137 supplied with air pressure from the supply pipe 34 through a restricted orifice 138. When the undesirably high steam pressure exists, the Bourdon tube 133 expands, moving the gate 135 to close the hole 136 and the pressure in the pipe 137 builds up to the point where the capsule 139 expands and causes the pilot valve 140 to vent air from the pipes 52 and 56. This drops the pressure on the diaphragm of the steam valve 36 and causes immediate closure of this valve.

The above described excess steam pressure control is not merely a safety feature. It also prevents hunting or overrunning of the juice temperature under control of the temperature controller. The variable factor that initiates operation of the temperature controller is the temperature of the juice at the element 47 after it has left the heat exchanger. There is necessarily some lag between the supply of additional steam to the exchanger and the resultant temperature increase at the responsive element 47, and this might result in heating the juice in the exchanger to excessive temperatures before the temperature controller could reduce the steam pressure. In such a situation, the above described steam pressure controller acts at once to reduce the steam pressure by cutting off the steam supply as soon as the maximum desirable heat exchanger steam pressure is attained.

The steam valve 36 is preferably designed so that it will be fully open when the air pressure in the diaphragm casing 35 is about 15 pounds per square inch, and will be fully closed when the diaphragm casing is vented to the atmosphere. Under these conditions, when the temperature of the juice leaving the heat exchanger is at the desired figure, the throttling pressure of the air will be some intermediate amount, say 7½ pounds. If the air pressure rises materially above this figure, say to 9 pounds, it is an indication that the temperature of the juice leaving the heat exchanger has fallen below the desired figure. The above mentioned air-operated microswitch 54 is designed to open at a pressure of about 9 pounds. Therefore, it will open under the conditions just described to break the circuit to the solenoid $S_3$ which, when energized, maintains the three-way valve 57 in the position shown in the drawings. However, when the solenoid S₃ is deenergized by the opening of the microswitch 54 the position of the three-way valve is reversed, and then air is supplied by an air pipe 58 through the three-way valve and pipe 59 to the diaphragm casing 60 of the modulating valve 41. This will close the modulating valve against the tension of a spring 61. Closing of the modulating valve will cause juice to pass through the relief valve 46 and be by-passed back to the heater tank and be recirculated through the heat exchanger until the temperature of the juice leaving the heat exchanger rises to the desired figure. Thus the passage of the juice through the heat exchanger is not materially slowed up as this might cause the high temperature maintained in the heat exchanger to scorch the juice or burn it on the tubes. Instead, the juice is permitted to flow quickly through the heat exchanger at all times and if it is not up to the proper temperature it is recirculated. When recirculation of the juice brings it up to the proper temperature the microswitch 54 closes thus energizing the solenoid S₃ to cut off the air supply to the modulating valve 41 through the pipes 58 and 59 and to place the modulating valve under the control of a float controlled pilot valve 62 on the deaerator 42. If the float 63 of the pilot valve is not in its raised position the pilot valve will admit no air through the three-way valve 57 to the diaphragm casing of the modulating valve 41 and this valve will remain open. If the level of the juice in the deaerator rises too high, as would be the case if the filling machine were to slow up or to stop, the float 63 would rise and cause the pilot valve to admit air through the three-way valve 57 (when the solenoid S₃ is energized) to the diaphragm casing of the modulating valve thereby closing this valve and preventing any more juice from entering the deaerator until the level of the juice therein recedes enough to lower the float 63. Thus the juice leaving the heat exchanger will be allowed to pass by the modulating valve 41 and enter the deaerator provided the level of the juice in the deaerator is not too high and provided further that the juice as it leaves the heat exchanger is up to the desired temperature.

The circuit of the solenoid S₃ may also be broken by the switches F₇ and F₈ controlled by the lower float 28 in the heater tank. When the float 28 descends to its intermediate position switch F₈ will first open and later switch F₇ will open as hereinbefore described. When both of these switches are open the circuit to the solenoid S₃ will be broken thus causing the three-way valve 57 to admit air from the pipe 58 directly to the diaphragm casing of the modulating valve 41 to close this valve. Therefore if the level of the juice in the heater tank recedes to a level corresponding with the mid position of the lower float 28 no more juice can be pumped from the heat exchanger circuit into the deaerator but will continue to circulate through the heat exchanger until the heater pump 31 ceases to operate.

The temperature of the juice as it leaves the heat exchanger is preferably above 212° F., as hereinafter explained. The deaerator is maintained at atmospheric pressure and therefore when the juice is sprayed into the deaerator through the openings 44 in the pipe 43 it is not only deaerated but enough liquid flashes into vapor to bring the temperature of the juice down to 212° almost instantly. The deaerator in this case therefore serves also as a temperature reducer. The juice may drop in temperature a few more degrees while in the deaerator and by the time it is canned or bottled its temperature will have dropped to about 205–208° F.

The air and vapor pass out of the top of the deaerator through a pipe 62' and may be discharged to the atmosphere or passed through a suitable condenser 63. If the system is so operated that the temperature of the juice leaving the heat exchanger is not far enough above 212° F. to cause substantial vaporization of tomato juice as well as water during flashing, the condenser 63' may be a simple one in which cold water condenses the vapor, and the water and condensate pass to a sewer. However, if the system is so operated that the temperature of the juice leaving the heat exchanger is well above 212° F., say 230° F. or over, there may be substantial vaporization of tomato juice, and under these circumstances it is desirable to use a condenser of the reflux type. This type of condenser is shown in the drawings. The vapor is condensed by cold water which enters the condenser at 64 and is discharged at 65 to a sewer. The condensed juice may be returned by means of a pipe 66 to the heater tank. In this way any tomato juice which is vaporized off during the flashing operation is recovered and returned to the system and undue concentration of the tomato juice is avoided.

Referring now to the wiring diagram shown in Fig. 2, it will be seen that the system can be placed in operative condition by pressing a push button 67. This will complete a circuit across the line 68—69 through conductor 70, relay coil 71, and conductor 72, the push button 73 in this conductor being normally closed. The relay closes contacts 74 and 75 whereupon a circuit is completed across the line through conductor 76, and through the relay coil, and conductor 72. The relay will therefore be held closed, and the starting button 67 may then be released. The system can be thrown out of operation at any time by pushing the button 73 thereby breaking the circuit through the coil 71 of the relay.

The closing of the contacts 74 and 75 also completes a circuit across the line through conductors 76, 77 and 78 when a push button 79 is in its closed position. In this circuit is located the solenoid S₁ which operates the three-way valve 27 (Fig. 1). Thus during normal operation of the system this solenoid will be energized to maintain the three-way valve 27 in the position shown in the drawings as hereinbefore described. The push button 79 may be operated whenever desired to break the circuit of solenoid S₁ thereby permitting the three-way valve 27 to move to the position in which air is admitted directly to the diaphragm casing of the inlet valve 3 to close this valve independently of the operation of the float 22.

It will be seen from the wiring diagram that when the switches F₁ and F₂, controlled by the lower float 21 in the salting tank, are both closed, a circuit is completed across the line through conductors 76, 77 and 80, relay coil 81, and conductor 82. When the coil 81 is energized, the relay closes contacts 83 and 84 and establishes a holding circuit through conductors 85, 86, relay coil 81, and conductor 82. Thus switch F₂ can open without deenergizing the relay coil 81. Both switches F₂ and F₁ must be open before this happens.

The relay 81 when energized also closes contacts 87 and 88 to complete a circuit across the line through conductors 76, 77, 89 and 90, normally closed contacts 91 and 92 of a relay hereinafter referred to, conductor 93, and thence in parallel through conductors 94, 95 and 96 and through magnetic motor starters MS—1, MS—2 and MS—3. These starters respectively control the starting and stopping of the salt-feeder motor, the flushing pump motor, and the salter pump motor and magnets 13 and 14. The push buttons 97, 98 and 99 shown in series with the three motor starters are normally in the position shown in the drawings, hence when relay 81 is energized upon the closing of switches $F_1$ and $F_2$ by the float 21, the three motor starters will operate to simultaneously start the three motors which run the salt-feeder, the flushing pump and the salter pump. Any of the three motor starters may be independently operated by pushing the corresponding button 97, 98 or 99 to complete a circuit across the line 68—69 through the corresponding conductor 100, 101 or 102.

When switches $F_3$ and $F_4$, controlled by the upper float 29 in the heater tank, are both closed as is the case when this float approaches its raised position, they complete a circuit through conductors 76, 77 and 103, relay coil 104, and conductor 105. When the relay 104 is energized it closes contacts 106 and 107 to establish a holding circuit for the relay coil through conductors 108, 109 and 105. Thus the opening of switch $F_4$, when the float 29 starts to descend, will not deenergize the relay. This will occur only when both switches are opened. When the relay 104 closes, it opens the contacts 91 and 92 of this relay thereby breaking the previously described circuits of motor starters MS—1, MS—2 and MS—3. This stops the salt-feeder motor, the flushing pump motor, and salter pump motor. The circuits to the three motor starters are again completed when the float 29 drops far enough to open not only switch $F_4$ but switch $F_3$ as well thereby deenergizing relay 104 and closing contacts 91 and 92.

The switches $F_5$ and $F_6$, which are closed during the first half of the upward movement of the lower float 28 in the heater tank, are connected in the electrical system in much the same way as the switches $F_1$ and $F_2$ which are controlled by the lower float in the salting tank. Through a relay they control the magnetic motor starter for the heater pump motor in much the same manner that the switches $F_1$ and $F_2$ through a relay control the motor starters of the three motors associated with the salting tank. When both switches $F_5$ and $F_6$ are closed a circuit is completed through the relay coil 110. When this relay closes, a holding circuit is established through contacts 111 and 112 so that the relay will not open during descent of the float 28 until both switches $F_5$ and $F_6$ open. When the relay is energized it also closes a pair of contacts 113 and 114 which complete a circuit through conductor 115 to the motor starter MS—4 which starts the heater pump motor. Conversely the circuit to this motor starter is interrupted when the relay 110 is deenergized upon the opening of both switches $F_5$ and $F_6$. The motor starter of the heater pump motor may be operated at any time by pushing a button 116 which completes a circuit to it across the line 68—69 through a conductor 117.

The switches $F_7$ and $F_8$ which are closed during the second half of the upward movement of the lower float 28 control a relay 118 in a similar manner. When this relay is energized upon the closing of both switches $F_7$ and $F_8$ a pair of contacts 119 and 120 are closed to complete circuits simultaneously to the coils of the two solenoids $S_2$ and $S_3$. As above stated when these solenoids are energized upon the closing of switches $F_7$ and $F_8$ the steam valve is opened to supply steam to the heat exchanger, and the modulating valve 41 of the deaerator is placed under control of the float 63. Both switches $F_7$ and $F_8$ must open before relay 118 is deenergized to thereby break the circuit to the solenoids $S_2$ and $S_3$ thus cutting off the steam supply to the heat exchanger and closing the modulating valve 41.

As shown in the wiring diagram, the microswitch 54 is located in the circuit of the solenoid $S_3$. As above stated this microswitch opens to de-energize the solenoid $S_3$ and thereby close the modulating valve 41 when the pressure in the diaphragm casing of the steam valve reaches about 5 pounds. Also, the microswitch 53 is the circuit of the solenoid $S_2$ for the purpose fully explained above.

The solenoid $S_2$ may be energized at any time by means of a manual switch 121 which is normally in the position shown in the wiring diagram but which may be moved to a second position to complete a circuit to the solenoid across the line 68—69 through a conductor 122. Similarly the solenoid $S_3$ may be energized at any time by means of a manual switch 123 which may be moved from its normal position shown in the drawings to a second position to complete a circuit to the solenoid across the line 68—69 through a conductor 124.

While the maximum temperature to which the juice is heated in the heat exchanger may be only slightly in excess of 160° F. and the juice held at that temperature for a correspondingly long time to inactivate the enzymes, a considerably higher temperature is preferably employed not only to reduce the holding time but also to effect sterilization. If the system is so operated that the temperature of the juice leaving the heat exchanger is around 226° F. the holding time at this temperature to effect sterilization should be about one minute. This holding time is determined by the length and diameter of the pipe 39—40 leading from the heat exchanger to the deaerator. If a holding time of one minute at the sterilizing temperature is desired, the length and diameter of the pipe 39—40 may be chosen accordingly. If the temperature of the juice leaving the heat exchanger is around 245° F. the holding time at this temperature need be only about 5 seconds and the pipe 39—40 may be designed to provide a holding period of that duration. As above stated it is much better to subject the juice to a high temperature for a short time than to subject it to a lower temperature for a longer time.

When the juice is sprayed into the deaerator maintained at atmospheric pressure the temperature of the juice immediately falls to 212° F. If the temperature of the juice leaving the heat exchanger is below 230° F. very little tomato juice will be vaporized when it is sprayed in the deaerator, and in this case the water vapor leaving the deaerator may be discharged to the atmosphere or condensed in a simple condenser as above stated. However, if the temperature of the juice leaving the heat exchanger is above 230° F., some tomato juice may be vaporized in the deaerator and under these circumstances it is advisable to use a reflux condenser of the type shown in the drawings so that the vaporized tomato juice may be recovered and returned to the system.

As above stated the temperature of the juice leaving the deaerator will be slightly less than 212° F. It will probably be around 205°–208° F. At the time of discharge from the deaerator the juice will have been maintained at a temperature of over 205° F. for at least 30 seconds which is a sufficient time to inactivate the enzymes at that temperature.

In the preferred form of the method and apparatus it requires about 38 seconds for the juice to pass through the heat exchanger. About one minute elapses from the time the juice is extracted until it is brought up to a temperature at which enzyme destruction begins. The entire treatment can be consummated in less than four minutes (which is the time required for the enzymes, if not inactivated, to convert substantially all the pectin into pectic acid in the case of a juice having a high enzyme concentration) and the juice will be brought up to the enzyme inactivating temperature so quickly after extraction that no substantial part of this interval of time will have elapsed.

Inasmuch as the filling takes place while the juice is hot, the usual sterilization period after filling of from five to twenty-five minutes may be eliminated. The juice is packaged in clean cans or bottles and air is preferably excluded during that operation so that after deaeration in the deaerator no further prolonged contact with air takes place. The containers are preferably tumbled so that enough hot juice comes into contact with the lid to destroy any contamination that might be present there. The canned or bottled juice may then be immediately cooled and labeled if so desired.

The method as hereinbefore described may be varied in a number of respects. For instance, when the juice is heated to above 230° F. and particularly in the above mentioned example in which it is heated to 245° F. and held there for five seconds, the juice may be cooled in a suitable heat exchanger to around 226° F. before it is sprayed into the deaerator. This will avoid excessive vaporization of the tomato juice during flashing and cooling to 212° F. and will eliminate the necessity of using a reflux condenser. In this form of the invention, the juice after being heated, passes through two temperature reducers, namely, the heat exchanger in which the first cooling takes place and the deaerator in which the juice is not only deaerated but also further cooled.

A further variation is to deaerate the juice before it is passed through the heater instead of deaerating it as a final step. In this case after the juice has been held at the desired temperature for the proper time it may be cooled in any suitable heat exchanger or temperature reducer to 212° F. or lower.

It will now be seen that we have provided an improved method and apparatus adapted to receive the tomato juice from the extractors, salt it, inactivate the enzymes, pasteurize or sterilize the juice, deaerate it, and reduce the temperature of the juice but deliver it while still hot to the filling machine, all in a continuous process. The entire system, when once started, is automatic and self-operating, not more than one operator being required to manage it. Even the salting is done automatically and the salt content of the juice is maintained more accurately than in the case of conventional methods, such as tablet salting or batch salting. The salting does not contaminate the juice inasmuch as the juice is sterilized after it is salted. Due to the recirculation of the juice through the heat exchanger, no juice can pass to the filling machine until it has received the full treatment. As previously stated the full treatment may consist of heating the juice to an enzyme-inactivating temperature of at least 160° F. and holding it there for at least two minutes, without raising it to a sterilizing temperature, but preferably during the treatment the juice is elevated to a temperature high enough to sterilize it and sufficiently high that the holding time at the elevated temperature may be brief, say 226° F. for one minute, or 245° F. for five seconds, or some intermediate temperature for a corresponding period. A sterilizing temperature of even less than 226° F. may be utilized if desired by holding the juice at the sterilizing temperature for a correspondingly longer period of time. Even in the case where the holding time at the sterilizing temperature is very brief, the holding time at an enzyme-inactivating temperature is sufficiently long to destroy the enzyme activity, this temperature being reached so soon after the juice is extracted that very little of the pectin is destroyed by the enzymes before inactivation of the enzymes begins. At the latest the enzyme-inactivating temperature is reached before all the pectin has been converted into pectic acid by the enzymes. Enough of the pectin is preserved to cause the solid matter to stay in suspension in the juice. Inasmuch as the heat treatment, particularly at the elevated sterilizing temperature, is very brief, the color, flavor and vitamin content of the juice will be preserved. The entire treatment may be consummated within three or four minutes, so even in the case of tomato juice having a high enzyme concentration it can be carried out within the time that is required after extraction for the enzymes to destroy the pectin in the juice under ordinary conditions.

It should be understood that while we have referred in the specification and claims to extraction of the juice at room temperature this should not be construed to exclude temperatures that may be somewhat higher than what is ordinarily regarded as room temperature. The reference to extraction of the juice at room temperature is more for the purpose of distinguishing from a temperature that is high enough to inactivate the enzymes than to limit the method to one in which the tomatoes are not heated at all during extraction

We claim:

1. A continuous process of producing canned tomato juice which comprises crushing tomatoes and separating the juice therefrom, continuously adding predetermined quantities of salt thereto and substantially immediately heating the juice to at least 160° F., and then rapidly further heating the juice to a temperature in excess of its boiling point but under sufficient pressure to maintain its water content in the liquid condition, thereby sterilizing said juice, thereupon reducing the pressure on the juice to effect the flash-vaporization of some of the water content thereof, whereby the remainder of the juice will be evaporatively cooled to a temperature between about 205° to 212° F., and placing said juice in containers and sealing it therein before its temperature drops below about 200° F.

2. In the process of producing canned tomato juice the step of heating said juice under superatmospheric pressure within a period not exceeding about thirteen minutes after its extraction from the fruit to a temperature in excess of its boiling point, holding it at that temperature for not over about six minutes, and thereafter evaporatively cooling said juice by expanding it into lower pressure surroundings, and canning the juice before its temperature has dropped below about 200° F.

3. The process of claim 2 in which the temperature at which the juice is held is about 245° F. and the time not over about five seconds.

4. Process of producing canned tomato juice which comprises crushing raw tomatoes to produce raw tomato juice, salting the same, and immediately thereafter heating it to an enzyme-inactivating temperature and under superatmospheric pressure to a temperature in excess of its normal boiling point to sterilize the same; evaporatively cooling the thus heated juice to a temperature between about 200° F. and 212° F., and placing the juice, without permitting its temperature to drop substantially below 200° F., into containers and sealing it therein.

5. A coordinated apparatus for the continuous production of tomato juice comprising the combination of means for adding a predetermined and proportioned amount of salt to the tomato juice, means for rapidly heating the salted juice to a sterilizing temperature under superatmospheric pressure, means for evaporatively cooling the heated juice by expansion thereof into lower pressure conditions in a closed container, and means for discharging the thus treated juice from the cooling means.

6. A coordinated apparatus for the production of tomato juice comprising the combination of means for adding a predetermined and proportioned amount of salt to the tomato juice, means for rapidly heating the salted juice to a sterilizing temperature, said means being at least in part under superatmospheric pressure, means for evaporatively cooling the heated juice by expansion thereof into lower pressure conditions and in a closed container, means for condensing aqueous vapor thus produced, means for returning the resulting condensate to the juice being heated, and means for discharging the evaporatively cooled juice from the cooling means.

7. A coordinated apparatus for the production of tomato juice comprising the combination of means for adding predetermined and proportioned amounts of salt to a continuously moving stream of tomato juice, means for rapidly heating said stream under superatmospheric pressure to a temperature above its boiling point, means for evaporatively cooling said heated juice comprising means for releasing the pressure thereon, means for determining the temperature of the juice leaving said heating means, and means for re-circulating the juice leaving said heating means into the stream of tomato juice undergoing heating when the temperature of said juice is below said predetermined temperature.

8. A coordinated apparatus for the continuous production of canned tomato juice which comprises means for blending freshly extracted tomato juice rapidly with predetermined quantities of salt, means for substantially immediately heating said juice under superatmospheric pressure to a temperature above that of its normal boiling point, means for expanding the thus heated juice into atmospheric pressure surroundings for the purpose of evaporatively cooling the same, and means for discharging the juice thus cooled to canning equipment.

HORACE L. SMITH, Jr.
WELD E. CONLEY, Jr.
WILFRID L. ATWOOD.